US012793176B2

(12) United States Patent
Korenwaitz et al.

(10) Patent No.: US 12,793,176 B2
(45) Date of Patent: *Nov. 10, 2026

(54) REAL TIME LOCAL FILTERING OF ON-SCREEN IMAGES

(71) Applicant: NETSPARK LTD., Giva't Shmu'el (IL)

(72) Inventors: Elyasaf Korenwaitz, Elon-More (IL); Ariel Yosef, Rehovot (IL); Zvi Bazak, Jerusalem (IL)

( * ) Notice: Subject to any disclaimer, the term of this patent is extended or adjusted under 35 U.S.C. 154(b) by 333 days.

This patent is subject to a terminal disclaimer.

(21) Appl. No.: 17/921,362

(22) PCT Filed: May 11, 2021

(86) PCT No.: PCT/IL2021/050538

§ 371 (c)(1),
(2) Date: Oct. 26, 2022

(87) PCT Pub. No.: WO2021/240500

PCT Pub. Date: Dec. 2, 2021

(65) Prior Publication Data

US 2023/0162337 A1 May 25, 2023

Related U.S. Application Data

(60) Provisional application No. 63/029,520, filed on May 24, 2020.

(51) Int. Cl.

| | |
|---|---|
| ***G06T 5/20*** | (2006.01) |
| ***G06F 8/65*** | (2018.01) |
| ***H04L 9/32*** | (2006.01) |

(52) U.S. Cl.
CPC .................. *G06T 5/20* (2013.01); *G06F 8/65* (2013.01); *H04L 9/3236* (2013.01); *H04L 9/3247* (2013.01)

(58) Field of Classification Search
USPC .......................................................... 382/260
See application file for complete search history.

(56) References Cited

U.S. PATENT DOCUMENTS 6,065,056 A 5/2000 Bradshaw et al.
6,493,744 B1 * 12/2002 Emens .................. H04L 67/564 707/999.009
7,046,139 B2 5/2006 Kuhn et al.
7,996,005 B2 8/2011 Lotter et al.
8,108,923 B1 1/2012 Satish et al.
8,285,118 B2 10/2012 Bronstein et al.
(Continued)

FOREIGN PATENT DOCUMENTS

CN 108170813 A 6/2018
WO 2010022185 A1 2/2010

*Primary Examiner* — Chineyere Wills-Burns
*Assistant Examiner* — Aaron Timothy Bonansinga

(57) ABSTRACT

The present invention relates to a system and method for detecting inappropriate content on a device and filtering content on a variety of media. Inappropriate content is detected by sampling a display of the device to produce a sample, preprocessing the sample using a local processor and locally stored software to determine if the sample is a likely candidate to include objectionable content, and if found to be a likely candidate, analyzing the sample using an artificial intelligence routine running on said local processor.

18 Claims, 6 Drawing Sheets

(56) References Cited

U.S. PATENT DOCUMENTS

| | | | | |
|---|---|---|---|---|
| 8,359,642 | B1 * | 1/2013 | Wurtenberger | H04L 63/102 726/1 |
| 8,701,137 | B2 | 4/2014 | Katpelly et al. | |
| 8,725,746 | B2 | 5/2014 | Yang et al. | |
| 8,826,322 | B2 | 9/2014 | Bliss et al. | |
| 8,984,581 | B2 | 3/2015 | Luna et al. | |
| 9,330,274 | B2 | 5/2016 | Schepis et al. | |
| 9,762,462 | B2 * | 9/2017 | Cherifi | G09B 19/00 |
| 10,962,939 | B1 * | 3/2021 | Das | G05B 13/029 |
| 11,450,104 | B1 * | 9/2022 | Mittal | G06T 11/00 |
| 2002/0087403 | A1 * | 7/2002 | Meyers | H04N 21/235 705/14.69 |
| 2006/0177198 | A1 | 8/2006 | Jarman et al. | |
| 2008/0049027 | A1 | 2/2008 | Hauke et al. | |
| 2008/0270233 | A1 | 10/2008 | Yip et al. | |
| 2009/0087015 | A1 | 4/2009 | Nierzwick et al. | |
| 2009/0128573 | A1 * | 5/2009 | Lambe | G06F 16/40 345/530 |
| 2009/0234831 | A1 * | 9/2009 | Ebadollahi | G06Q 30/0201 707/999.005 |
| 2009/0288131 | A1 | 11/2009 | Kandekar et al. | |
| 2011/0034176 | A1 * | 2/2011 | Lord | G06F 16/50 348/241 |
| 2013/0117464 | A1 * | 5/2013 | Brown | H04L 12/1827 709/246 |
| 2015/0077548 | A1 | 3/2015 | Meredith et al. | |
| 2016/0150278 | A1 | 5/2016 | Greene | |
| 2016/0171109 | A1 * | 6/2016 | Gnanasekaran | G06F 16/9535 707/754 |
| 2016/0241766 | A1 * | 8/2016 | Bender | H04N 23/611 |
| 2016/0300388 | A1 * | 10/2016 | Stafford | A63F 13/69 |
| 2016/0323307 | A1 | 11/2016 | Savant | |
| 2017/0061248 | A1 * | 3/2017 | Ryan, Jr. | G06F 18/214 |
| 2017/0109118 | A1 * | 4/2017 | Ady | G06F 3/04883 |
| 2017/0134406 | A1 * | 5/2017 | Guo | H04L 63/123 |
| 2017/0149795 | A1 * | 5/2017 | Day | H04L 63/108 |
| 2017/0289624 | A1 * | 10/2017 | Avila | G06F 16/78 |
| 2019/0228103 | A1 * | 7/2019 | Shirey | G06F 18/24155 |
| 2020/0077144 | A1 * | 3/2020 | Zavesky | H04N 21/454 |
| 2020/0077150 | A1 * | 3/2020 | Fox | H04N 21/4318 |
| 2020/0145723 | A1 * | 5/2020 | Vaughn | H04N 21/25883 |
| 2020/0162412 | A1 * | 5/2020 | Mei | G06N 3/084 |
| 2020/0169787 | A1 * | 5/2020 | Pearce | H04N 21/4532 |
| 2020/0302029 | A1 * | 9/2020 | Holm | G06F 18/2113 |

* cited by examiner

REAL TIME LOCAL FILTERING OF ON-SCREEN IMAGES

RELATED APPLICATION/S

This application claims the benefit of priority under 35 USC § 119(e) of U.S. Provisional Patent Application No. 63/029,520 filed May 24, 2020, the contents of which are incorporated herein by reference in their entirety.

FIELD AND BACKGROUND OF THE INVENTION

The present invention, in some embodiments thereof, relates to system and method for detecting inappropriate content on a device and, more particularly, but not exclusively, filtering content on a variety of media.

International Patent Publication no. WO2010022185 appears to disclose that, "Mobile phones and other portable devices are equipped with a variety of technologies by which existing functionality can be improved, and new functionality can be provided. Some aspects relate to visual search capabilities, and determining appropriate actions responsive to different image inputs. Others relate to processing of image data. Still others concern metadata generation, processing, and representation. Yet others concern user interface improvements. Other aspects relate to imaging architectures, in which a mobile phone's image sensor is one in a chain of stages that successively act on packetized instructions/data, to capture and later process imagery. Still other aspects relate to distribution of processing tasks between the mobile device and remote resources ("the cloud"). Elemental image processing (e.g., simple filtering and edge detection) can be performed on the mobile phone, while other operations can be referred out to remote service providers. The remote service providers can be selected using techniques such as reverse auctions, through which they compete for processing tasks. A great number of other features and arrangements are also detailed."

U.S. Pat. No. 8,701,137 appears to disclose, "Systems and methods . . . for enabling an administrator to monitor and control usage of media content in a locale. In one embodiment, the locale includes one or more media devices that have access to media content from one or more local and/or remote content sources. Usage data defining usage of the media content by a user is obtained. A pattern including two or more media segments consumed by the user is detected based on the usage data and one or more predefined pattern detection rules. The administrator is then enabled to review the pattern and choose whether to block usage. Usage of at least one of the media segments included in the pattern is then blocked at the one or more media devices at the locale in response to the administrator choosing to block usage of the at least one of the media segments included in the pattern."

U.S. Pat. No. 8,108,923 appears to disclose, "Controlling access to a protected network . . . In some embodiments, one or more events that occur will a host is disconnected from the protected network arc logged. The log is provided to one or more devices associated with the protected network when the host requests access to the protected network after a period in which it was not connected. In some embodiments, a network access control or other device or process uses the log to determine whether and/or an extent to which the host should be permitted to connect to the network."

US Patent Publication no. 20080270233 appears to disclose, "Architecture that leverages enabling technologies for tracking offline activity of a user, and rating performance of offline/online publishers of content and/or advertisements. Knowledge about user offline interests can be accumulated and used to target the user with smart advertisements when offline or online. Moreover, the performance of publishers of the offline content computed by merchants who contract with publishers to provide the best exposure. In support thereof, rate information in the form of response rate and conversion rate can be computed and analyzed for each offline publisher. A publisher referral ID for a publisher is inserted into detectable indicia associated with offline media such as print media, audio media, video media, etc. When a user interacts with the offline content using a cell phone, the captured information is forwarded to an online advertisement component framework for responding to the user interaction (e.g., a purchase transaction or request for further information)."

U.S. Pat. No. 9,762,462 appears to disclose, "An approach . . . for an anti-bullying service. A service platform monitors interaction data from one or more applications, wherein the interaction data is associated with an interaction between a source and a target. The service platform analyzes the interaction data to parse one or more indicators of a monitored conduct between the source and the target. The service platform then initiates at least one of (a) a recording of the interaction data; (b) a transmission of an alert message, the one or more indicators, the interaction data, the monitored conduct, or a combination thereof to a third party; and (c) a pushing of an anti-conduct application to a source device associated with the source, a target device associated with the target, or a combination thereof based on the monitored conduct, the one or more indicators, or a combination thereof."

US Patent Publication no. 20090288131 appears to disclose, "Systems and methods . . . for providing advance content alerts during playback of a media item. In one embodiment, the advance content alerts arc provided to a mobile device, such as a mobile telephone, of an associated user. More specifically, a user registers his or her mobile device with a media player and configures the types of content for which the user would like to receive advance content alerts. Thereafter, during playback of a media item, the media player identifies upcoming content for which the user desires an advance content alert. In response, the media player generates an advance content alert and sends the advance content alert to the mobile device of the user via, for example, a local wireless communication link."

U.S. Pat. No. 8,725,746 appears to disclose that, "A method for filtering user information takes into account not only specific keywords in the user information, but also related user-characteristic data (e.g., user activity data), and allows targeted user characteristics to be determined from multiple aspects of user activities. In one aspect, the disclosed method adopts different filtering schemes for different types of targeted users to improve the recognition accuracy with respect to the target user information. The method determines a suitable filtering scheme using a correspondence relationship between the filtering scheme and keywords and user-characteristic data. The method uses modeling of sample users and multiple candidate filtering schemes to formulate targeted filtering scheme. An apparatus for implementing the method is also disclosed."

Additional background art includes U.S. Pat. Nos. 8,984,581, 7,046,139, 984,581, 8,285,118, US Patent Publication no. 20170289624, U.S. Pat. Nos. 8,826,322, 8,984,581, 6,065,056, US Patent Publication no. 20170061248, US Patent Publication no. 20090087015, U.S. Pat. No. 7,996,005, US Patent Publication no. 20060177198, U.S. Pat. No. 9,330,274

SUMMARY OF THE INVENTION

According to an aspect of some embodiments of the invention, there is provided a method of local content filtering for a mobile device including: sampling a display of the device to produce a sample; preprocessing the sample using a local processor and locally stored software to determine if the sample is a likely candidate to include objectionable content; in response to the sample if found to be a likely candidate, analyzing the sample using an artificial intelligence routine running on the local processor.

According to some embodiments of the invention, the method further includes sampling only a portion of the display.

According to some embodiments of the invention, the portion includes a video window, an image window, or a live video window.

According to some embodiments of the invention, a rate of the sampling is dependent on a foreground application running on the device.

According to some embodiments of the invention, the rate is greater when the foreground application is one of a social network, a live camera display application, an image display application, a video display application, and an Internet browser than when the application is not likely to contain inappropriate content such as a navigation application.

According to some embodiments of the invention, the method further includes checking a resource availability on the device and performing the analyzing when there are at least a minimum free resource and not performing the analyzing when there are less than the minimum free resources.

According to some embodiments of the invention, the preprocessing includes at least one of white balance correction, a gamma correction, an edge enhancement, image resolution adjustment, an FFT, edge detection, pattern extraction, texture classification, a color histogram, motion detection, feature recognition, entropy measuring, signature detection and skin tone recognition.

According to some embodiments of the invention, the method further includes sending a content item to an external server for further processing when the analyzing produces ambiguous results.

According to some embodiments of the invention, the method further includes sending a content item to an external server when the content is determined to be objectionable.

According to some embodiments of the invention, a single content item is sent to a large number of devices, such that the analyzing is divided between the devices.

According to some embodiments of the invention, the preprocessing and the analyzing arc performed by an application running on under an operating system Android, windows, IOS.

According to some embodiments of the invention, the preprocessing is performed by pretrained routines.

According to some embodiments of the invention, the sampling is more heavy based on active or background applications, regions of a display, regions of storage, type of application or source of the content, particularly social networks, search results, instant messaging and entertainment media.

According to some embodiments of the invention, the software includes a hash function or signatures for identifying previously recognized undesirable content.

According to some embodiments of the invention, the software includes a hash function or signatures for generating signatures for recognition of newly recognized undesirable content.

According to some embodiments of the invention, personalized instructions define how strictly to sample and analyze content, how many resources to use in analysis, and how to act when objectionable content is identified.

According to an aspect of some embodiments of the invention, there is provided a system for local content filtering for a mobile device including: computer code for sampling a display of the device to produce a sample and preprocessing the sample using a local processor and locally stored software to determine if the sample is a likely candidate to include objectionable content; and an artificial intelligence routine running on the local processor analyzing the sample for a sought content in response to the sample if found to be a likely candidate; wherein the system is a self-contained application or exists as an add-on to an existing application. 18 The system described above, wherein the application is self-updating when new content is detected or updates of the application are including with updates of the device or the existing application.

According to some embodiments of the invention, the preprocessing includes prefiltering that uses low computational cost methodologies to eliminate images with a low likelihood of undesirable content.

According to some embodiments of the invention, the preprocessing uses meta data to set a sampling rate and/or low resource prefilter.

Unless otherwise defined, all technical and/or scientific terms used herein have the same meaning as commonly understood by one of ordinary skill in the art to which the invention pertains Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) and/or a mesh network (meshnet, emesh) and/or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g., the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
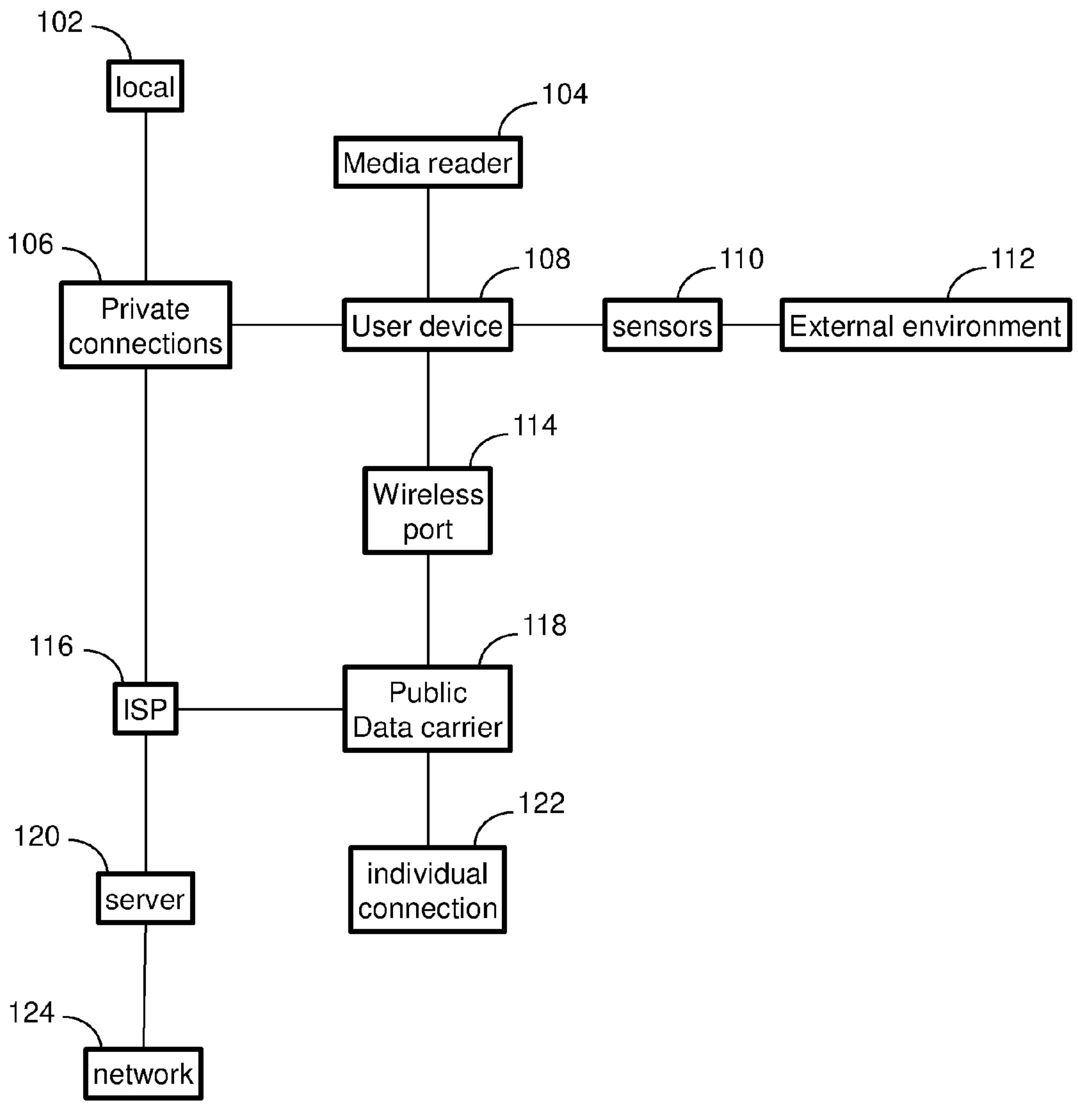
FIG. 1 is an illustration of data ports of mobile user device.

The present invention, in some embodiments thereof, relates to system and method for detecting inappropriate content on a device and, more particularly, but not exclusively, filtering content on a variety of media.

An aspect of some embodiments of the current invention relates to real time filtering of images on a screen using local resources of a low power computing device (e.g., a cell phone, a device running operating system such as Android, IOS, Solaris, Unix, Linux, AmigaOS and/or Windows, Minix operating systems, smart TV's, Internet of Things (IoT) devices, any display device). In some embodiments, a local processor samples images on a display screen of the device. For example, the sampling is configured to detect undesirable images while avoiding unnecessary analyzing of non-significant pixels. For example, samples may be taken from a part of the screen that is likely to contain undesirable content while other parts of the screen are not sampled and/or arc sampled at a lower frequency. For example, samples may be taken when the foreground includes an application having a high probability to contain undesirable content while other applications are not sampled and/or are sampled at a lower frequency. For example, the system includes a prefilter that uses low computational cost methodologies to eliminate images with a low likelihood of undesirable content. In some embodiments, a pretrained artificial intelligence routine (for example using a Convolutional Neural Network CNN) is used to detect undesired image content using local resources on a low powered device (e.g., a cellphone running on battery) and/or a device having an Android operating system.

There has been a great deal of interest in supervision of use of mobile devices. Interest comes from parents trying to protect their children and/or content providers trying to protect their intellectual property from unapproved distribution and/or corporations trying to protect their intellectual property from industrial espionage and/or police trying to detect or prevent organized crime and terrorism and/or governments trying to detect and prevent spying. Many content filtering systems use an external server to monitor and/or control data transmitted to and/or from a device over a network. The use of a network server for content filtering has some significant disadvantages. Use of a network server to filter content may entail a great deal of computing power on a dedicated server. Another issue may be access to data. For example, data may be transferred in an encrypted form, and/or analysis of content of encrypted data may entail a decryption stage on the local machine which presents problems for server access. Another potential problem is that many mobile devices have multiple ports that can receive and/or transmit data without the data passing through the network and/or the supervising network server. Monitoring such data from an external server would require the server to control local ports of the device and/or send data passing through the local port to the external server for analysis. Such external oversight may be cumbersome and/or unfeasible for various reasons. For example, a network server may not be able to monitor data that is transferred and/or viewed while the device is off-line. For example, monitoring non-network content with an external server may result in sending large quantities of local data to an external server for analysis. The increased use of network bandwidth and battery power from data transmissions may be prohibitively expensive in terms of resource use, time and/or inconvenience for a device user.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is an illustration of data ports of mobile user device 108 in accordance with an embodiment of the current invention. In some embodiments, a content filtering application may run on mobile device and/or protect a user from content arriving from entry ports of different types and/or from data from various sources.

In some embodiments, the device may include a wireless port 114 connected to a public data carrier 118 (for example a cellular network). The public data carrier 118 may give access to individual connections 122 (for example phone connections and/or SMS messaging). The public data carrier may also give access to networks such as the Internet and/or various networks that work over the Internet. For example, communication over the Internet may be over an Internet Service Provider (ISP) 116. In some embodiments, a server 120 and/or private network 124 may intervene to control access to some networks (e.g., the Internet).

In some embodiments, the device may include a private port 114 (e.g., a hard-wired connector and/or a short-range wireless port [e.g., Bluetooth and/or infra-red (IR) port and/or a near field connector (NFC)]).

In some embodiments, a device may include a media reader 104. Optionally, a removable media such as a memory card may be read by the media reader allowing access and/or allowing collecting of large quantities of data quickly.

In some embodiments, a device may include a sensor 110 (for example a camera and/or a microphone) that collects data from the environment 112.

In some embodiments, private data from a private connection 106, a media reader 104, an individual connection 122 and/or a sensor 110 may allow the device to receive and/or export data in a manner that bypasses a server 120. Optionally, a local program 102 may monitor such data. For example, the local monitoring program 102 may send data to the server 120 for content analysis and/or filtering. Sending such local data to a server may be expensive in terms of resources. For example, sending data to the server may use up bandwidth and/or battery power (for example, when the data is transmitted over a cellular network 124 to the server). Alternatively or additionally, data from private data sources may be analyzed locally. In some cases, (for example, where data is generated fast for example, when user makes a video and/or inserts a removable media into a reader) a large quantity of data may be generated quickly and/or present a serious challenge to local resources for analysis. In some embodiments, a local content scanning application may scan data as it is accessed. For example, the application may sample and/or scan images from a display of the device and/or images that are accessed by another application. For example, the application may sample sounds played to a user and/or sound files that are accessed by another application.

Figure 2:
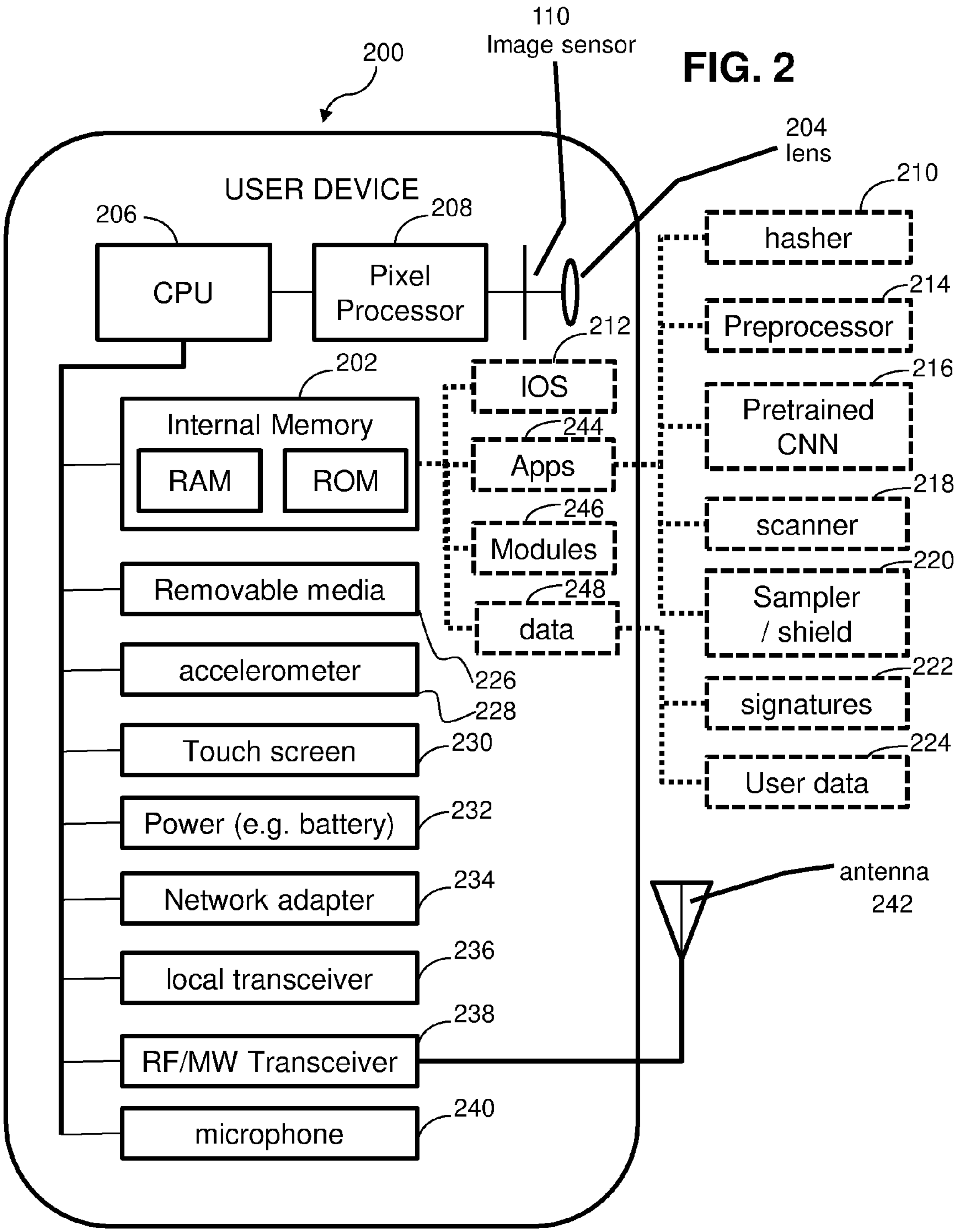
FIG. 2 is an illustration of a mobile device.

FIG. 2 is an illustration of a mobile device 200 in accordance with an embodiment of the current invention. In some embodiments, software for sampling, monitoring and/or analyzing content is stored in a local memory 202. Optionally, the software may include a sampler/shield routine 220 that samples content (for example images and/or videos) and/or sends data 224 for analysis (for example the data may include the content and/or a portion thereof and/or information about the content. For example, sampler may include instructions that sample content differently based on active and/or background applications, regions of a display and/or regions of storage 206. The sample may be configured to efficiently screen dangerous content while reducing the requirement for system resources for analysis. Optionally, the software may include a preprocessor 214 that screens content quickly and/or recognizes items that are likely candidates to include undesirable content. Alternatively or additionally, the preprocessor 214 may reduce content for example, to make it easier to analyze. For example, a preprocessor 214 may select frames from a video and/or reduce the image density and/or remove portions of an image 208 before sending it for further analysis. The video and/or image may be obtained from a local camera with a lens 204 and image sensor 110, from a scanner 218, from local storage 202 or from a network. The user device also comprises removable media 226, an accelerometer 228, touch screen 230, a power source (e.g., battery) 232, network adaptor 234, local transceiver 236, RF/MW transceiver 238, a microphone 240 and/or an antenna 242. Optionally the software includes a hash function 210 and/or signatures 222 for identifying previously recognized undesirable content and/or for generating signatures for recognition of newly recognized undesirable content. In some embodiments, an AI routine (for example, commercial and/or freely available CNN routines for example routines or applications 244 available from Google, Microsoft, Apple etc. for operating systems such as Android, Windows and/or IOS 212) is used for recognizing undesired content. Optionally, the routines are pretrained 216. The software and/or data 248 may be periodically updated. Optionally data and/or applications may be stored on internal memory 202 of a device. Alternatively, some or all of the applications and/or data may be stored on removable media 226 and/or network accessible memory. In some embodiments, user data may include personalized instructions that define how strictly to sample and/or analyze content and/or how many resources to use in the analysis and/or when to send data for further analysis and/or how to act when objectionable content is found and/or what areas of the display, what applications and/or what areas of memory to scan. A hasher 210 (e.g., a hash function) may be used to recognize previously identified undesirable content for example based on a signature 222. Alternatively or additionally, the hasher 210 may derive a signature from content that is recognized as undesirable. Optionally, signatures 222 will be uploaded and/or downloaded to and/or from an external server. For example, signatures of undesirable content found on the user device may be uploaded to the server and/or sent to other devices to help identify the content if it finds its way there (e.g., over the Internet and/or social networks). For example, signatures of undesirable content found on the other devices may be downloaded on to the user device to help identify the content if it finds its way to the user device.

In some embodiments a monitoring application may run on a mobile device to detect undesirable content (for example, violence, pornography, misappropriation of intellectual property etc.). Optionally, the application may be a standard and/or self-contained application. Alternatively or additionally, the application may exist as an add-on (e.g., an SDK add-on) to an existing application (for example a social network and/or messenger application (e.g., Facebook and/or WhatsApp)).

In some embodiments, software loaded on to a mobile device may include one or more modules 246. For example, a module may be configured to perform a repetitive task efficiently. For example, modules 246 may include a white balance correction module, a gamma correction module, an edge enhancement module, a JPEG compression module, an FFT module, an edge detection module, a pattern extraction module, a Fourier-Mellin module, a texture classifier module, a color histogram module, motion detection module, a feature recognition module, and/or a skin tone detection module (for example to grade a percentage of skin tones in an image). In some embodiments, the device may include a private port 114 (e.g., a hard-wired connector and/or a short-range wireless port [e.g., Bluetooth and/or infra-red (IR) port and/or a near field connector (NFC)]).

Figure 3:
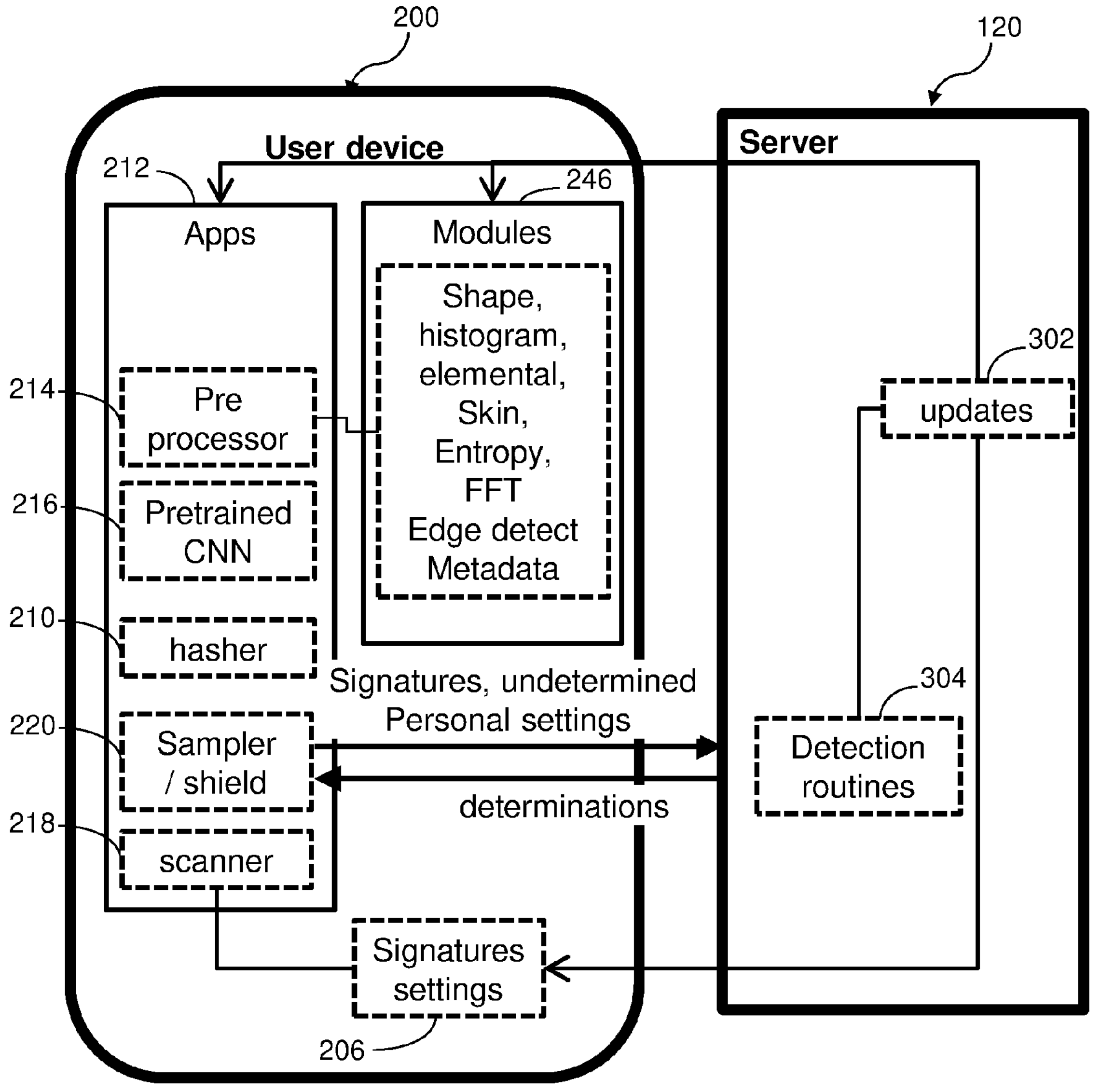
FIG. 3 is an illustration of data flow between a server and a mobile device.

FIG. 3 is an illustration of data flow between a server 120 and a mobile device 200 in accordance with an embodiment of the current invention. In some embodiments, a server and/or centralized database will be in communication with a user device. For example, the server may send software updates 302 and/or signatures of undesirable content. In some, embodiments, when the user device fails to fully determine the desirability of a piece of content, it may upload the content and/or a portion thereof and/or a derivative thereof to the server for further analysis. In some, embodiments, when the user device produces ambiguous results sending a content item to an external server for further processing. For example, the further processing may be by detection routines 304 on the server and/or by hand screening. Alternatively or additionally, content that is found undesirable on the user device may be sent to the server for double checking to make sure that the analysis was correct and/or to derive signatures to send to other devices and/or for archiving and/or for statistical purposes and/or for larger scale analysis for example of sources and/or spreading of content. In some embodiments, a user will change his personal content protection settings (for example using a user interface of the user device and/or upload those settings to a server. For example, this may allow the user to control the server to screen content arriving to his device from the Internet.

Figure 4:
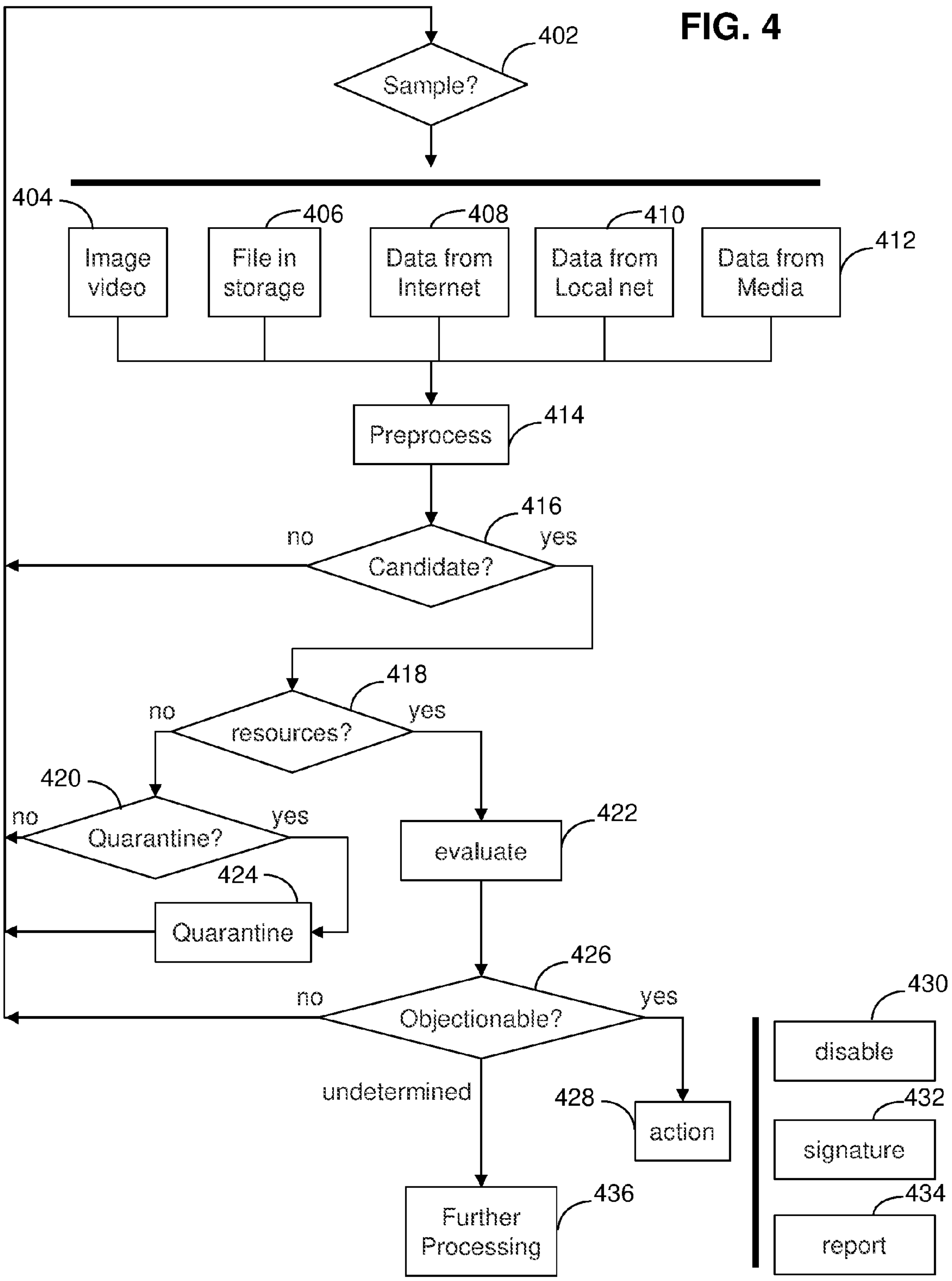
FIG. 4 is a flow chart of a method of monitoring content use in a mobile device.

FIG. 4 is a flow chart of a method of monitoring content use in a mobile device in accordance with an embodiment of the current invention. In some embodiments, an application running on a user device will sample 402 images on the screen of the device periodically (for example once a second or more and/or once in a period between 1 to 5 seconds and/or once in a period between 5 to 60 seconds). If the image appears to include undesired content a notification is sent to the local device (e.g., informing the user and/or blocking the content and/or stopping the offending application) and/or to a remote device (for example, a server tracking content of a large number of such devices). For example, the application may use an operating system function to take a screenshot and/or may check an image stored on a memory of the device (for example an image transferred over a social network and/or an instant messenger). Optionally the sampling will be targeted. For example, sampling may be targeted to particular areas of the screen (e.g., a video display 404 and/or a live image display and/or picture display and/or a game area) while other portions of the screen (e.g., a menu, icons, a title, a text box) are ignored and/or sampled less (e.g., less frequently and/or at lower resolution and/or are discarded more easily under preliminary screening). For example, in some embodiments, a full screen graphic display mode may be sampled more frequently than partial screen images. In some embodiments, data from some applications 406 (e.g., content 408 from the internet, social networks, search results, instant messaging and/or entertainment media content 412 [e.g., Instagram, Facebook, YouTube]) may be sampled more heavily than other applications (e.g., map applications (Google Maps, Waze), financial applications, text applications, weather applications, device maintenance applications etc.). Optionally, other data may be used in preprocessing 414 and/or determination of a sampling rate. For example, a portion of a video with loud abrupt sounds and/or mixed male and female voices may be sampled more heavily than another location. In some embodiments, a portion of a screen associated with one application (e.g., a video viewer and/or a social network) may be sampled more and analyzed more carefully than an image on a portion of a screen associated with another application (for example a map application).

In some embodiments, content coming from sources other than the network may also be screened. For example, a content filtering program may monitor content 412 on removable media and/or images captured by a camera and/or transmitted over a local communication medium 410 (e.g., Bluetooth and/or a hard-wired communication port).

In embodiments various strategies may be employed to facilitate scanning of images with limited computing power. In some embodiments, parallel processing may be used over multiple devices. For example, a video may have been distributed to multiple users (e.g., over a social network). Optionally, a server may divide scanning of the video between the devices of different users who received the video. For example, one device may analyze one portion of a video while another device analyzes another portion. For example, one device may analyze a certain frame (e.g., one or more key frames) while the other device analyzes another frame. For example, a preprocessing step 414 may make a coarse examination and/or eliminate frames/images that are not candidates 416 for evaluation (for example using a CNN routine). For example, images unlikely to hold unique objectionable content may be eliminated and/or may not be candidates 416 for evaluation. For example, this may reduce the computational burden of compared to a full analysis of the entire sample. For example, the preprocessing may include elemental image processing, simple filtering, skin tone detection, a General Classification Function (GCF) for example an Edge Histogram Distribution (EHD), comparison of scalar and/or vector quantities may facilitate quick elimination of redundant images and/or low quality images and/or images that are unlikely to have undesirable content. Meta data may also be used in preprocessing to set a sampling rate and/or low resource prefilter. For example. GPS data may be used to determine if a picture was taken in a location likely to include objectionable content.

In some embodiments, a method of local content filtering may be configured to reduce the amount of data transferred over a network. Optionally, functions, such as preprocessing and/or AI analysis may be done locally on a user device. For example, an image may not be transferred to a server unless it has been recognized as undesirable content and/or the local machine failed to positively determine the presence of undesirable content (for example, an image with suspected but unconfirmed undesirable content may be sent for further processing for example by a server).

In some embodiments, when an image is evaluated 422 and positively identified as objectionable 426 various actions 428 may be taken 430, 432, 434. For example, a signature (e.g., a hash function and/or hash value) may be derived and/or sent to other devices for example to facilitate recognition of the content without requiring full analysis and/or without requiring transferring of the offending image over a network to another machine. Optionally the objectionable content may be disabled 420 (e.g., deleted and/or quarantined). Alternatively or additionally, objectional content may be uploaded to a server. In some embodiments, various actions of sampling and/or scanning are performed in real time (e.g., before and/or while the content is accessed). Optionally, certain functions (for example uploading content to a server) may be performed off-line (e.g., in the background and/or at times when resources arc available). In some cases, when suspicious content is found, it may be quarantined 424 at a time of low system resources 418 and/or later evaluated 436 when more resources are available. Additionally or alternatively, the rate of sampling may be adjusted due to the availability of system resource 418 (for example battery power, memory, spare processing power). Optionally the content monitoring system may self update when new content is detected and/or updates of the content monitoring system may be including with other updates of the device, for example, operating systems updates and/or updates of other components of the monitoring application. For example, training updates may be sent to a CNN routine with updates of routing.

Figure 5:
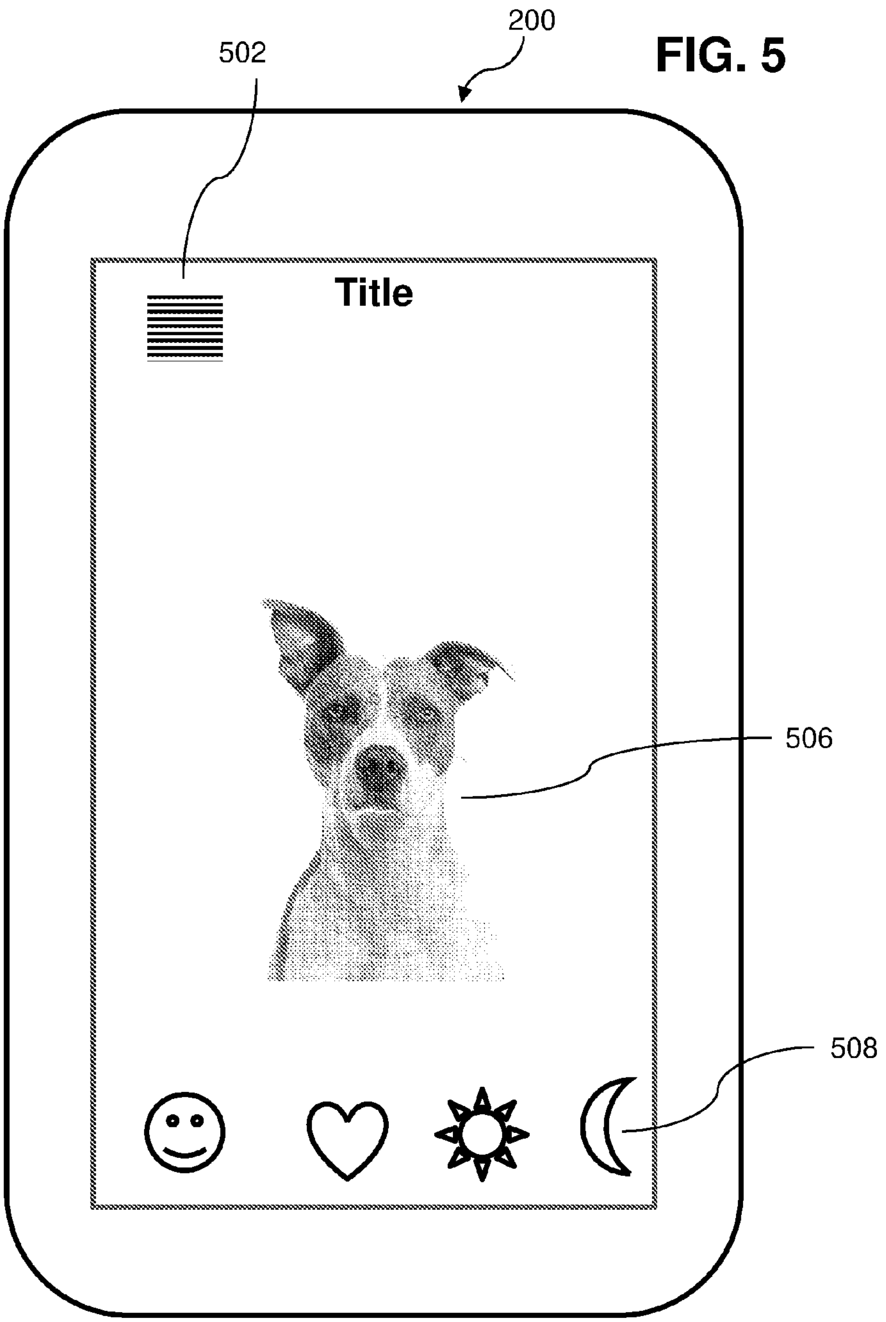
FIG. 5 is a screenshot illustration of sampling.

FIG. 5 is a screenshot illustration of sampling in accordance with an embodiment of the current invention. Optionally the sampling will be targeted. For example, sampling may be targeted to particular areas of the screen 506 (e.g., a video display and/or picture display and/or a game area) while other portions of the screen (e.g., a menu 502, icons 508, a title, a text box 504) arc ignored and/or sampled less (e.g., less frequently and/or at lower resolution and/or are discarded more easily under preliminary screening).

In some embodiments, the monitoring routine will check only specific areas and not the entire device. For example, only certain applications and/or within the application certain areas for example video playback in a video window, an image window, or a live video window.

Figure 6:
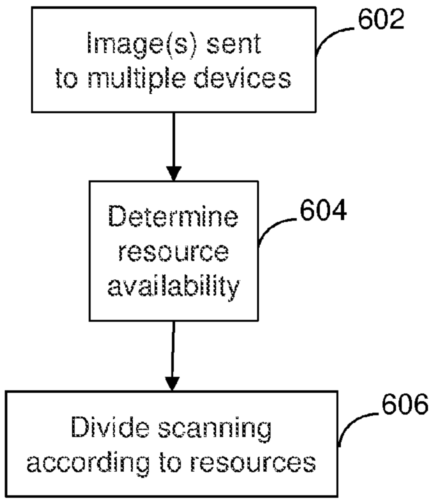
FIG. 6 is a flow chart of a method of evaluating content on multiple devices.

FIG. 6 is a flow chart of a method of evaluating content on multiple devices 602 in accordance with an embodiment of the current invention. In some embodiments, for example, when a single content item is sent to a large number of devices 602, analysis for undesired content will be divided between the devices. For example, some frames of a video may be analyzed by one device and/or other frames by another device. Optionally, before assigning work to a device, the server will check resource availability 604. Additionally or alternatively, checking resource availability 604 on the device and performing said analyzing when there are at least a minimum free resource and not performing said analyzing when there are less than said minimum free resources. For example, a low power device and/or a device with low battery and/or low memory availability and/or high processor use may not be used for the analysis and/or may be used for only a small part of the analysis while a device with more available resources may be used for more of the analysis 606.

It is expected that during the life of a patent maturing from this application many relevant new technologies, artificial intelligence methodologies, computer user interfaces, image capture devices, viewing devices, low power computing devices, personal computing devices etc. will be developed and the scope of the terms for design elements, analysis routines, user devices is intended to include all such new technologies a priori.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples arc illustrative only and arc not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Data and/or program code may be accessed and/or shared over a network, for example the Internet. For example, data may be shared and/or accessed using a social network. A processor may include remote processing capabilities for example available over a network (e.g., the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of local content filtering of images for a mobile device comprising:

sampling from a screen of the mobile device a live image obtained from a local camera of the mobile device, said sampling to produce a sample;

prefiltering the sample using a local processor and locally stored software to determine whether the sample is a likely candidate to include objectionable content and whether to invoke an artificial intelligence routine;

responding in real time to said prefiltering by:

eliminating said sample from further processing in response to said prefiltering determining that said sample is not a likely candidate;

further analyzing the sample for the objectionable content using the artificial intelligence routine running on said local processor in response to said prefiltering determining that said sample is a likely candidate when sufficient processing resources are available on the mobile device;

quarantining the live image from which the sample was obtained in response to said prefiltering determining that said sample is a likely candidate when processing resources on the mobile device are insufficient;

and subsequently evaluating the quarantined live image using the artificial intelligence routine when additional processing resources become available; and taking an action in real time in response to when said further analyzing identifies the objectionable content in the sample, wherein said action is performed locally on the mobile device.

2. The method of claim 1, further comprising sampling only a portion of the screen.

3. The method of claim 1, wherein said prefiltering includes performing at least one of white balance correction, a gamma correction, an edge enhancement, image resolution adjustment, an FFT, edge detection, pattern extraction, texture classification, a color histogram, motion detection, feature recognition, entropy measuring, signature detection, and skin tone recognition.

4. The method of claim 3, wherein said first evaluation of content characteristics is performed prior to invocation of the artificial intelligence routine.

5. The method of claim 1, wherein said prefiltering and said further analyzing using the artificial intelligence routine are performed by an application running locally on an operating system selected from the group consisting of Android, Windows, and iOS.

6. The method of claim 1, wherein said prefiltering is performed by pretrained routines stored locally on the mobile device and used in said first evaluation of content characteristics.

7. The method of claim 1, wherein the software includes a hash function or signatures used in said first evaluation of content characteristics or in said further analyzing using the artificial intelligence routine for generating signatures for recognition of newly recognized undesirable content.

8. The method of claim 1, wherein personalized instructions define how strictly to sample and analyze content, how many resources to use in analysis, and how to act when objectionable content is identified.

9. The method of claim 1, wherein the mobile device is a cellular phone.

10. The method of claim 1, wherein the sampling is targeted to a specific region of the screen likely to contain objectionable content based on a foreground application currently active on the mobile device.

11. The method of claim 1, wherein said prefiltering determines whether the sample is a likely candidate based on content characteristics of the sample independent of a source of the image.

12. The method of claim 1, wherein said prefiltering further determines whether to invoke the artificial intelligence routine based on both the content characteristics of the sample and availability of processing resources.

13. A system for local content filtering of images for a mobile device comprising:

computer code for:

sampling from a screen of the mobile device a live image obtained from a local camera of the mobile device, said sampling to produce a sample and prefiltering the sample using a local processor and locally stored software, wherein the prefiltering performs a first evaluation of content characteristics of the sample based on image content of the sample to determine whether the sample is a likely candidate to include objectionable content and whether to invoke an artificial intelligence routine;

responding in real time to said prefiltering by:

eliminating the sample from further processing in response to said prefiltering determining that the sample is not a likely candidate; and further analyzing the sample for the objectionable content using the artificial intelligence routine running on said local processor in response to said determining that said sample is a likely candidate when sufficient processing resources are available on the mobile device; and taking an action in real time in response to said further analyzing identifying the objectionable content in the sample wherein said action is performed locally on the mobile device.

14. The system of claim 13, wherein the computer code is self-updating when new content is detected or updates of said computer code are included with updates of the device or existing computer code.

15. The system of claim 13, wherein the prefiltering includes prefiltering that uses low computational cost methodologies to eliminate images with a low likelihood of undesirable content.

16. The system of claim 13, wherein the mobile device is a cellular phone.

17. The system of claim 13, wherein said prefiltering determines whether to invoke the artificial intelligence routine based on content characteristics of the sample independent of a source of the image.

18. The system of claim 13, wherein said prefiltering is performed prior to invocation of the artificial intelligence routine.

* * * * *